United States Patent
Hayashi et al.

(10) Patent No.: US 7,207,425 B2
(45) Date of Patent: Apr. 24, 2007

(54) ROTARY DAMPER

(75) Inventors: Ken Hayashi, Aichi (JP); Shunsuke Okabayashi, Toyonaka (JP); Masanobu Kawamoto, Yokohama (JP); Masayuki Nishiyama, Chigasaki (JP)

(73) Assignee: Nifco Inc., Yokohama (JP)

( * ) Notice: Subject to any disclaimer, the term of this patent is extended or adjusted under 35 U.S.C. 154(b) by 17 days.

(21) Appl. No.: 10/950,573

(22) Filed: Sep. 28, 2004

(65) Prior Publication Data
US 2005/0077130 A1   Apr. 14, 2005

(30) Foreign Application Priority Data
Oct. 8, 2003   (JP) .............................. 2003-349465

(51) Int. Cl.
*F16D 57/00* (2006.01)
(52) U.S. Cl. ...................................... 188/290; 188/307
(58) Field of Classification Search ................ 188/290, 188/294, 306, 307, 293
See application file for complete search history.

(56) References Cited

U.S. PATENT DOCUMENTS 4,674,608 A * 6/1987 Morris et al. ............... 188/290

6,729,448 B2 * 5/2004 Takahashi ................... 188/294
2004/0045398 A1   3/2004 Hayashi

FOREIGN PATENT DOCUMENTS

| EP | 0 639 727 | 2/1995 |
|----|-----------|--------|
| JP | 4-34015   | 6/1992 |
| JP | 8-177939  | 7/1996 |

* cited by examiner

Primary Examiner—Melanie Torres
(74) Attorney, Agent, or Firm—Manabu Kanesaka (57) ABSTRACT

A rotary damper includes a housing; a viscous fluid filled in the housing; a rotor disposed inside the housing and having a shaft part partially protruding from the housing and a resistance part provided on the shaft part for moving in the viscous fluid inside the housing; and a seal member for sealing between the shaft part and the housing to prevent leakage of the viscous fluid. The rotary damper further includes a first sloping part provided on an upstream side of the rotating resistance part and having a distance relative to an inner surface of the housing gradually decreasing toward a downstream side; and a second sloping part provided on a downstream side of the rotating resistance part and having a distance relative to the inner surface of the housing gradually increasing toward a downstream side.

4 Claims, 4 Drawing Sheets

ROTARY DAMPER

BACKGROUND OF THE INVENTION AND RELATED ART STATEMENT

The invention relates to a rotary damper for damping a rotation of a driven gear engaging a gear or a rack.

A rotary damper is formed of a housing; a viscous fluid filled inside the housing; a rotor disposed in the housing and having a shaft part partially protruding from the housing and a resistance part provided on the shaft part for moving within the viscous fluid inside the housing; and a seal member for sealing between the shaft part of the rotor and the housing to prevent leakage of the viscous fluid. A driven gear is attached to the shaft part protruding from the housing (refer to Japanese Patent Publication (Kokai) No. 04-34015).

A conventional rotary damper has a resistance part having an elliptical shape, so that air mixed into the housing during assembly is not allowed to be positioned between the resistance part of a rotor, i.e. a torque generating part, and a bottom surface or ceiling surface of the housing. However, because the rotor rotates in both directions, the air mixed into the housing generates a noise when the air moves over the resistance part to the opposite side of the resistance part. The noise generated when the air mixed into the housing moves over the resistance part is believed to be a bursting sound caused by the air mixed into the housing being compressed by moving up the resistance part and then being released suddenly when moving over the resistance part. Such a noise tends to happen more frequently when the viscous fluid has a higher viscosity, or when a distance between the rotor and the housing is narrower.

In view of the problem described above, an object of the invention is to provide a rotary damper, in which air mixed into a housing and compressed by moving up on a resistance part is gradually released during assembly, so that it is possible to prevent a noise caused by the air mixed into a housing even when the rotor rotates in both directions.

Further objects and advantages of the invention will be apparent from the following description of the invention.

SUMMARY OF THE INVENTION

In order to attain the objects described above, according to a first aspect of the present invention, a rotary damper includes a housing; a viscous fluid filled in the housing; a rotor disposed inside the housing and having a shaft part partially protruding from the housing and a resistance part provided on the shaft part for moving in the viscous fluid inside the housing; and a seal member for sealing between the shaft part and the housing to prevent leakage of the viscous fluid. The rotary damper further includes a first sloping part provided on an upstream side of the rotating resistance part and having a distance relative to an inner surface of the housing gradually decreasing toward a downstream side; and a second sloping part provided on a downstream side of the rotating resistance part and having a distance relative to the inner surface of the housing gradually increasing toward a downstream side.

According to a second aspect of the invention, in the rotary damper in the first aspect, the first sloping part and second sloping part are provided on an outer perimeter part of the resistance part.

According to a third aspect of the invention, in the rotary damper in the first aspect, the first sloping part and second sloping part are provided on an inner perimeter surface of the housing.

According to a fourth aspect of the invention, in the rotary damper in one of the first to third aspects, a plurality of the first sloping parts and second sloping parts are provided.

In the first aspect of the invention, the rotary damper includes the first sloping part provided on an upstream side of the rotating resistance part and having a distance relative to the inner surface of the housing gradually decreasing toward a downstream side; and the second sloping part provided on a downstream side of the rotating resistance part and having a distance relative to the inner surface of the housing gradually increasing toward a downstream side. Even if air mixed into the housing flows into between the inner surface of the housing and the first sloping part during assembly, the air is gradually compressed and then is gradually released. Accordingly, it is possible to prevent generation of a noise caused by the air mixed into the housing even when the rotor rotates in both directions.

In the second aspect of the invention, the first sloping part and second sloping part are provided on the outer perimeter part of the resistance part, where a negative pressure tends to be generated most easily when the rotor rotates. In the third aspect of the invention, the first sloping part and second sloping part are provided on the inner perimeter surface of the housing. Accordingly, it is possible to effectively prevent generation of a noise caused by the air mixed into the housing.

In the fourth aspect of the invention, a plurality of the first sloping parts and second sloping parts are provided. Accordingly, it is possible to adjust torque within a wide range and increase the torque regardless of a position of the air mixed into the housing.

DETAILED DESCRIPTION OF PREFERRED EMBODIMENTS

Figure 1:
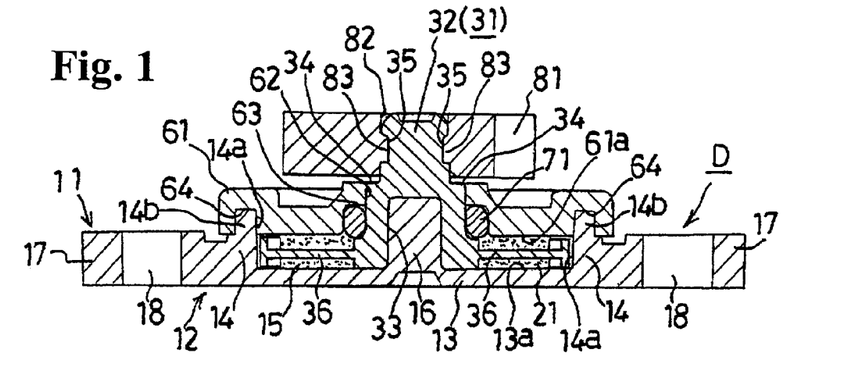
FIG. 1 is a sectional view of a rotary damper according to a first embodiment of the invention.
Figure 2:
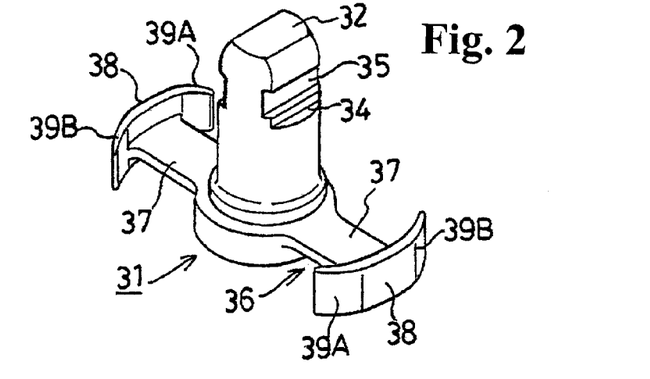
FIG. 2 is a perspective view of a rotor shown in FIG. 1.

Hereunder, embodiments of the invention will be explained with reference to the accompanying drawings. FIG. 1 is a sectional view of a rotary damper according to a first embodiment of the invention, and FIG. 2 is a perspective view of the rotor shown in FIG. 1.

As shown in FIG. 1, a rotary damper D includes a case 11 made of a synthetic resin; silicone oil 21 as a viscous fluid filled inside the case 11; and a rotor 31 made of a synthetic resin and disposed inside the case 11. The rotor 31 has a shaft part 32 partially protruding from the case 11, and resistance parts 36 provided on the shaft part 32 for moving within the silicone oil 21 inside the case 11. The rotary damper D further includes a cap 61 made of a synthetic resin for closing an opening of the case 11 and having a through-hole 62 for inserting the shaft part 32 of the rotor 31; an O-ring 71 as a seal member for sealing between this cap 61 and the shaft part 32 of the rotor 31 to prevent leakage of the silicone oil 21; and a driven gear 81 made of a synthetic resin and attached to the shaft part 32 of the rotor 31 projecting from the cap 61. A housing is formed of the case 11 and the cap 61.

The case 11 is formed of a case main body 12 having a bottom part 13 with a circular planar shape and a cylindrical wall part 14 extending along an outside edge of the bottom part 13; a cylindrical bearing part 16 provided in the center of an inner surface 13a of the bottom part 13; and attachment flanges 17 provided on an outer perimeter of the case body 12 in a radial direction at, for example, a 180-degree interval, and having an attachment hole 18.

An encircling thin protruding cylindrical part 14b protrudes from an upper side of the cylindrical wall part 14, and has an inner surface extending from an inner perimeter surface 14a of the cylindrical wall part 14. A receiving part 15 is formed inside the case main body 12 for retaining the silicone oil 21, and corresponds to a part below the thin protruding cylindrical part 14b.

The rotor 31 is formed of the shaft part 32 with a cylindrical shape, and a plurality of, in the embodiment two provided at a 180-degree interval, resistance parts 36 extending from the shaft part 32 outwardly in a radial direction. A recess 33 with a cylindrical shape is formed on a bottom surface of the shaft part 32 for engaging a bearing part 16 of the case 11 to be rotatable. The shaft part 32 is also provided with I-cut sections 34 at a part thereof protruding from the cap 61, and horizontal coupling grooves 35 on a plane part (perpendicular plane) of each of the I-cut sections, respectively.

As shown in FIG. 2, each of the resistance part 36 is formed of a radial flat plate 37 extending horizontally and radially from the shaft part 32, and an arc-shaped plate 38 provided on an outer perimeter edge of the radial flat plate 37 in the circumferential direction and facing an inner surface of the case 11, i.e. the inner perimeter surface 14a of the cylindrical wall part 14. Further, sloping parts 39A and 39B are provided on the arc-shaped plate 38 at both ends thereof in the horizontal direction, as shown in FIG. 2, so that a distance gradually decreases toward a center side.

When the rotor 31 rotates in a clockwise direction in FIG. 2, the sloping parts 39A become a first sloping part positioned at an upstream side of the resistance parts 36, where a distance relative to the inner perimeter surface 14a of the cylindrical wall part 14 gradually decreases toward a downstream side, and the sloping parts 39B become a second sloping part positioned at a downstream side of the resistance parts 36, where a distance relative to the inner perimeter surface 14a of the cylindrical wall part 14 gradually increases toward a downstream side. Also, when the rotor 31 rotates in the counterclockwise direction in FIG. 2, the sloping parts 39B become the first sloping part, and the sloping parts 39A become the second sloping part.

A through-hole 62 is provided at the center of the above-mentioned cap 61 for inserting the shaft part 32 of the rotor 31. An enlarged diameter section 63 having a cylindrically cut out portion reaching a bottom end is provided on a lower side of the through-hole 62 for receiving an O-ring 71. An encircling coupling recess 64 is provided around an outside edge of the cap 61 at a lower side for engaging the thin protruding cylindrical part 14b of the case main body 12. Reference numeral 61a indicates an inner surface (lower surface) of the cap 61. An I-cut attachment hole 82 is provided at a center of the driven gear 81, and a coupling band 83 is provided on a flat planar part of the attachment hole 82 for engaging the coupling groove 35 provided on the shaft part 32 of the rotor 31.

A process of assembling the rotary damper D will be explained next. First, the shaft part 32 of the rotor 31 is inserted into the O-ring 71, and silicone oil 21 is applied to the recess 33 and the resistance parts 36. Then, a part of the shaft part 32 and the resistance parts 36 are installed inside the receiving part 15 so that the bearing part 16 of the case 11 is fitted into the recess 33. After a suitable quantity of silicone oil 21 is filled into the receiving part 15, the thin protruding cylindrical part 14b is fitted into the coupling recess 64 of the cap 61 while the shaft part 32 is inserted into the through-hole 62, and the opening of the case 11 is closed with the cap 61.

When the opening of the case 11 is closed with the cap 61, almost all of the air inside the thin protruding cylindrical part 14b is discharged to the outside of the case 11. The thin protruding cylindrical part 14b closely contacts the cap 61, and the O-ring 71 is retained inside the enlarged diameter section 63 to prevent leakage of the silicone oil 21 from between the shaft part 32 and the cap 61. Then, the thin protruding cylindrical part 14b and the cap 61 are sealed around tightly together with, for example, high-frequency welding. When the shaft part 32 protruding from the cap 61 is pressed into the attachment hole 82 of the driven gear 81, the coupling band 83 is fitted into the coupling groove 35, thereby completing the assembly of the rotary damper D.

An operation of the rotary damper D will be explained next. First, when the rotor 31 rotates in the clockwise direction in FIG. 2, the resistance part 36 rotates in the clockwise direction within the silicone oil 21. Since viscosity and shear resistance of the silicone oil 21 acts on the resistance part 36, the rotation of the rotor 31 is damped. Accordingly, rotation or movement of a gear, rack, or the like engaging the driven gear 81 attached to the rotor 31 is damped and slowed down.

When the rotor 31 rotates in the clockwise direction, on the downstream side of the resistance parts 36, a part of the air mixed into the case 11 during the assembly moves and follows a negative pressure part generated at a downstream side of the sloping parts 39B of the resistance parts 36. Also, on the upstream side of the resistance parts 36, a part of the air mixed into the case 11 during the assembly is gradually released between the inner perimeter surface 14a and the outer perimeter surfaces of the sloping parts 39B, and moves to follow the negative pressure part generated at a downstream side of the sloping parts 39B, after being gradually compressed between the inner perimeter surface 14a of the cylindrical wall part 14 and the outer perimeter surfaces of the sloping parts 39A. The rest of the air mixed into the case 11 during the assembly passes above and below the radial flat plates 37 in a virtually non-compressed state, and moves so as to follow the negative pressure part generated at a downstream side of the sloping parts 39B.

When the rotor 31 rotates in the counterclockwise direction in FIG. 2, the resistance parts 36 rotate in the counterclockwise direction within the silicone oil 21. Since the viscosity and shear resistance of the silicone oil 21 acts on the resistance parts 36, the rotation of the rotor 31 is damped. Accordingly, the rotation or movement of a gear, rack, or the like engaging the driven gear 81 attached to the rotor 31 is damped and slowed down.

When the rotor 31 rotates in the counterclockwise direction, a large part of the air following the negative pressure part generated at the downstream side of the sloping parts 39B when the rotor 31 rotates in the clockwise direction passes above and below the radial flat plates 37 in a virtually non-compressed state, and moves following a negative pressure part generated at the downstream side of the sloping parts 39A. A part of the air is gradually compressed between the inner perimeter surface 14a and the outer perimeter surfaces of the sloping parts 39B, and then is gradually released between the inner perimeter surface 14a and the outer perimeter surfaces of the sloping parts 39A. Incidentally, torque is generated at a part between the inner perimeter surface 14a of the cylindrical wall part 14 and the outer perimeter surface of the rotor 36.

According to the first embodiment of the invention as described above, the sloping parts 39A and 39B (first sloping part and second sloping part) are provided with respect to the inner perimeter surface 14a of the cylindrical wall part 14. Accordingly, a part of the air mixed into the case 11 during the assembly is gradually compressed between the inner perimeter surface 14a and the sloping parts 39A (or sloping parts 39B), and then is gradually released between the inner perimeter surface 14a and the sloping parts 39B (or sloping parts 39A) Therefore, even if the rotor 31 rotates in both directions, the air mixed into the case 11 is no longer released suddenly, so that it is possible to prevent the generation of a noise caused by the air mixed into the case 11. Further, the sloping parts 39A and 39B are provided on the outer perimeter parts of the resistance parts 36 where a negative pressure tends to be generated most easily when the rotor 31 rotates, it is possible to effectively prevent the generation of a noise caused by the air mixed into the case 11.

Figure 3:
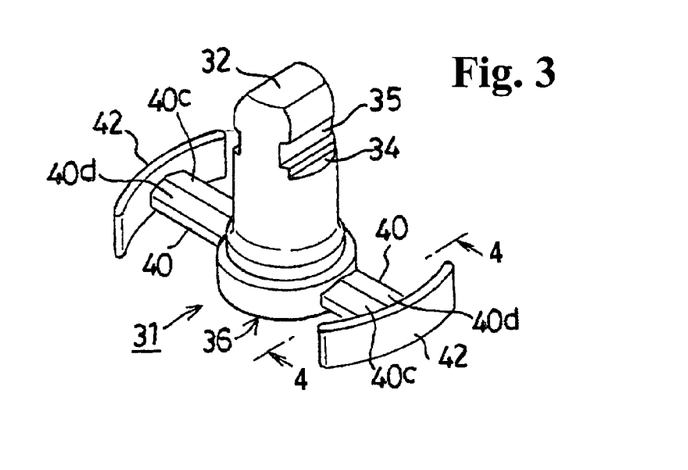
FIG. 3 is a perspective view of a rotor constituting a rotary damper according to a second embodiment of the invention.
Figure 4:
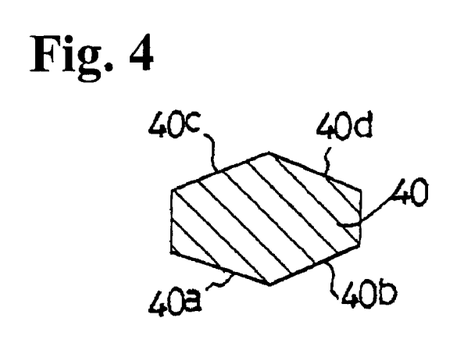
FIG. 4 is a sectional view of a radial pole taken along line 4—4 in FIG. 3.

FIG. 3 is a perspective view of a rotor constituting a rotary damper according to a second embodiment of the invention, and FIG. 4 is a sectional view of a radial pole taken along line 4—4 in FIG. 3. The same symbols are assigned to the same or corresponding parts shown in FIG. 1 and FIG. 2, and their explanations are omitted. In these drawings, the rotor 31 made of a synthetic resin is held inside the case 11, and is formed of the shaft part 32 partially protruding from the case 11, and a plurality of resistance parts 36, in the embodiment two provided at a 180-degree interval, extending horizontally and radially from the shaft part 32.

Each of the resistance part 36 is formed of a radial pole 40 extending radially from the shaft part 32, and an arc-shaped plate 42 provided on an outer perimeter edge of the radial pole 40 in the circumferential direction and facing the inner surface of the case 11, that is, the inner perimeter surface 14a of the cylindrical wall part 14.

As shown in FIG. 4, the above-mentioned radial poles 40 have a hexagonal cross-section. Two lower surfaces are sloping surfaces (sloping parts) 40a and 40b in which a center in a width direction moves toward and away from the inner surface 13a of the bottom part 13 of the case 11 from both ends in the width direction toward the center. Two upper surfaces are sloping surfaces (sloping parts) 40c and 40d in which a center in the width direction moves toward and away from the inner surface 61a of the cap 61 from both ends in the width direction toward the center.

When the rotor 31 rotates in the clockwise direction in FIG. 3, the sloping parts 40a become a first sloping part positioned on the upstream side of the resistance parts 36, where the distance with respect to the inner surface 13a of the bottom part 13 gradually becomes narrower toward the downstream side. The sloping parts 40b become a second sloping part positioned on the downstream side of the resistance parts 36, where the distance with respect to the inner surface 13a of the bottom part 13 gradually becomes wider toward the downstream side. The sloping parts 40c become a first sloping part positioned on the upstream side of the resistance parts 36, where the distance with respect to the inner surface 61a of the cap 61 gradually becomes narrower toward the downstream side. The sloping parts 40d become a second sloping part positioned on the downstream side of the resistance parts 36, where the distance with respect to the inner surface 61a of the cap 61 gradually becomes wider toward the downstream side. Accordingly, when the rotor 31 rotates in the counterclockwise direction in FIG. 3, the sloping parts 40b and 40d become the first sloping part, and the sloping parts 40a and 40c become the second sloping part.

Because the assembly and operation of the rotary damper D in the second embodiment are the same as in the first embodiment, their explanations are omitted.

When the rotor 31 rotates forward, the air mixed into the case 11 during the assembly moves so as to follow a negative pressure part generated at the downstream side of the arc-shaped plates 42 of the resistance parts 36. When the rotor 31 rotates in reverse, the air following the negative pressure part generated at the downstream side of the arc-shaped plates 42 when the rotor 31 rotates [forward] does not pass between the inner perimeter surface 14a of the cylindrical wall part 14 and the outer perimeter surfaces of the arc-shaped plates 42 (resistance part 36), i.e. the torque generating part, and passes above and below the radial poles 40 and moves toward the negative pressure part generated at the downstream side of the arc-shaped plates 42 on the opposite side.

Thus, the air passing above and below the radial poles 40, for example, is gradually compressed between the inner perimeter surfaces 14a and 61a and the sloping surfaces 40a and 40c (or sloping surfaces 40b and 40d), and then is gradually released between the inner perimeter surfaces 14a and 61a and the sloping surfaces 40b and 40d (or sloping surfaces 40a and 40c). In the second embodiment, the same effect as in the first embodiment can be obtained. Also, because the sloping surfaces 40a to 40d are provided along the radial direction, the generation of noise can be prevented without depending on a position of the air mixed into the case 11, thereby increasing torque and a range of adjusting the torque.

Figure 5:
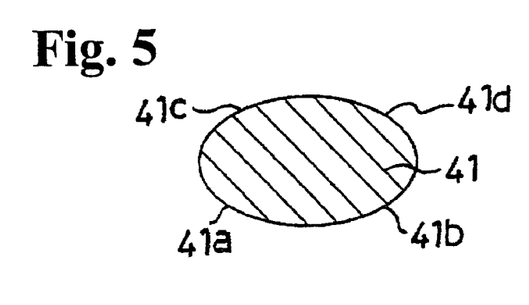
FIG. 5 is a sectional view of a rotor constituting a rotary damper according to a third embodiment of the invention.

FIG. 5 is a sectional view of a rotor constituting a rotary damper according to a third embodiment of the invention. The same symbols are assigned to the same or corresponding parts as in FIGS. 1 to 4, and their explanations are omitted. FIG. 5 is a sectional view similar to FIG. 4. A only difference from the rotor shown in FIG. 3 is an elliptical sectional shape of the radial poles constituting the rotor. The rotor 31 made of a synthetic resin shown in FIG. 5 is held inside the case 11, and is formed of the shaft part 32 partially protruding from the case 11, and two resistance parts 36 provided at a 180-degree interval and extending horizontally and radially from the shaft part 32.

Each of the resistance part 36 is formed of the radial pole 41 extending radially from the shaft part 32, and the arc-shaped plate 42 provided on the outer perimeter edge of this radial pole 41 in the circumferential direction and facing the inner surface of the case 11, that is, the inner perimeter surface 14a of the cylindrical wall part 14.

The above-mentioned radial poles 41 have an elliptical sectional shape with a horizontal long axis (parallel to the inner surface 13a of the bottom part 13 and the inner surface 61a of the cap 61) and a vertical short axis (perpendicular to the inner surface 13a of the bottom part 13 and the inner surface 61a of the cap 61). The surface on the lower side is formed in the sloping surfaces (sloping parts) 41a and 41b, in which the center in the width direction moves toward and away from the inner surface 13a of the bottom part 13 of the case 11 from both ends in the width direction toward the center. The surface on the upper side is formed in the sloping surfaces (sloping parts) 41c and 41d in which the center in the width direction moves toward and away from the inner surface 61a of the cap 61 from both ends in the width direction toward the center.

When the rotor 31 rotates in the clockwise direction in FIG. 3, the sloping surface 41a becomes a first sloping part positioned on the upstream side of the resistance part 36, where the distance gradually becomes narrower toward the downstream side with respect to the inner surface 13a of the bottom part 13, and the sloping surface 41b becomes a second sloping part positioned on the downstream side of the resistance part 36, where the distance gradually becomes wider toward the downstream side with respect to the inner surface 13a of the bottom part 13. Also, the sloping surface 41c becomes a first sloping part positioned on the upstream side of the resistance part 36, where the distance gradually becomes narrower toward the downstream side with respect to the inner surface 61a of the cap 61, and the sloping surface 41d becomes a second sloping part positioned on the downstream side of the resistance part 36, where the distance gradually becomes wider toward the downstream side with respect to the inner surface 61a of the cap 61.

Also, when the rotor 31 rotates in the counterclockwise direction in FIG. 3, the sloping surfaces 41b and 41d become the first sloping part, and the sloping surfaces 41a and 41c become the second sloping part. Because the assembly and operation of the rotary damper D in the third embodiment are the same as in the first embodiment, their explanations are omitted. Also, because the flow (movement) of the air mixed into the case 11 during the assembly is the same as in the second embodiment, its explanation is omitted. In the third embodiment, the same effect as in the first or second embodiment can be obtained.

Figure 6:
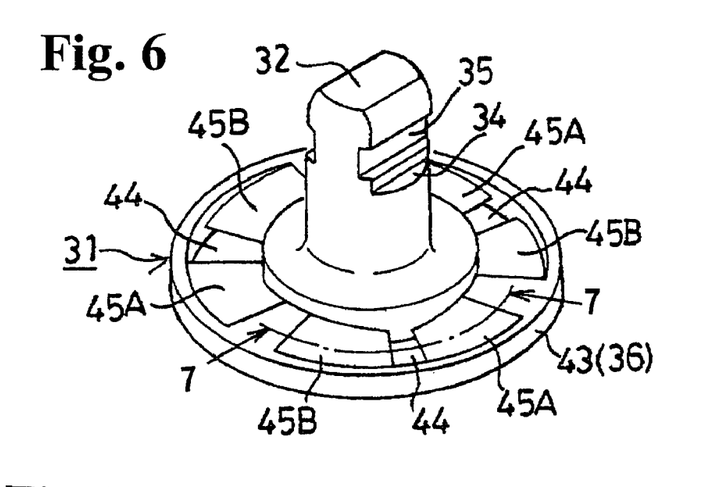
FIG. 6 is a perspective view of a rotor constituting a rotary damper according to a fourth embodiment of the invention.
Figure 7:
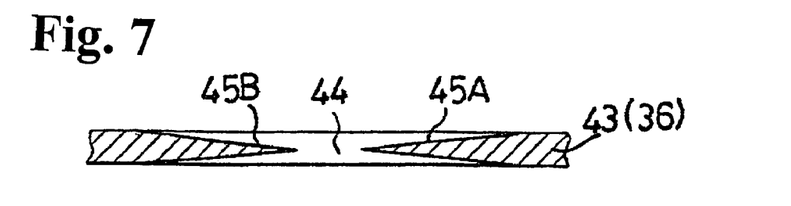
FIG. 7 is a sectional view taken along line 7—7 in FIG. 6.

FIG. 6 is a perspective view of a rotor constituting a rotary damper according to a fourth embodiment of the invention, and FIG. 7 is a sectional view taken along line 7—7 in FIG. 6. The same symbols are assigned to the same or corresponding parts as in FIGS. 1 to 5, and their explanations are omitted. In these drawings, the rotor 31 made of a synthetic resin is held inside the case 11, and is formed of the shaft part 32 partially protruding from the case 11, and the resistance part 36 comprising a circular flat plate 43 with a circular planar shape connected horizontally to the shaft part 32.

Also, on the circular flat plate 43 (resistance part 36), as shown in FIG. 7, there are provided three rectangular holes (slits) 44 extending radially at positions separated by 120 degrees. In addition, there are provided sloping parts 45A and 45B extending from both sides in the circumferential direction toward each of the holes 44 and having inclined upper and lower sides moving toward and away from each other.

When the rotor 31 rotates in the clockwise direction in FIG. 6, the sloping parts 45A become the first sloping part positioned on the upstream side of the resistance part 36, where the distance gradually becomes narrower toward the downstream side with respect to the inner surface 13a of the bottom part 13 and the inner surface 61a of the cap 61. The sloping parts 45B become the second sloping part positioned on the downstream side of the resistance part 36, where the distance gradually becomes wider toward the downstream side with respect to the inner surface 13a of the bottom part 13 and the inner surface 61a of the cap 61. Also, when the rotor 31 rotates in the counterclockwise direction in FIG. 6, the sloping parts 45B become the first sloping part, and the sloping parts 45A become the second sloping part.

In the fourth embodiment, torque generation parts are located between the inner perimeter surface 14a and the outer perimeter surface of the rotor 36 (circular flat plate 43), and between the upper and lower surfaces of the rotor 36 (circular flat plate 43) and the inner surfaces 13a and 61a. Because the assembly and operation of the rotary damper D in the fourth embodiment are the same as in the first embodiment, their explanations are omitted.

As for the flow (movement) of the air mixed into the case 11 during the assembly, for example, the air is gradually compressed between the sloping parts 45A (or sloping parts 45B) and the inner surfaces 13a and 61a, and then is gradually released between the sloping parts 45B (or sloping parts 45A) and the inner surfaces 13a and 61a. Also, the air flowing into one of the holes 44 from the sloping parts 45A or the sloping parts 45B moves following a negative pressure part generated at the downstream side of the sloping parts 45A or the sloping parts 45B, and tends not to flow into the other of the holes 44.

In the fourth embodiment, the same effect as in the first-third embodiments can be obtained. Also, in the fourth embodiment, even if the holes 44 are not provided, an effect same as that in the first to third embodiments can be obtained.

Figure 8:
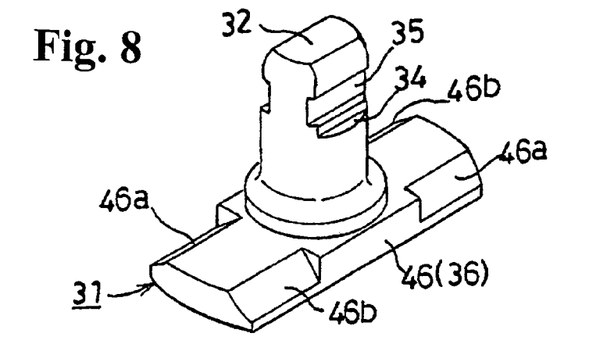
FIG. 8 is a perspective view of a rotor constituting a rotary damper according to a fifth embodiment of the invention.

FIG. 8 is a perspective view of a rotor constituting a rotary damper according to a fifth embodiment of the invention. The same symbols are assigned to the same or corresponding parts in FIGS. 1 to 7, and their explanations are omitted.

The rotor 31 made of a synthetic resin shown in FIG. 8 is held inside the case 11, and is formed of the shaft part 32 partially protruding from the case 11, and the resistance part 36 comprising a radial flat plate 46 having an I-cut circle planar shape extending from the shaft part 32 horizontally and radially at a 180-degree interval.

On the radial flat plate 46 (resistance part 36), there are provided sloping surfaces (sloping parts) 46a and 46b extending to an outer perimeter on both upper sides at the upstream side and the downstream side in the rotational direction.

When the rotor 31 rotates in the clockwise direction, the sloping surfaces 46a become the first sloping part positioned on the upstream side of the resistance part 36, where the distance gradually becomes narrower toward the downstream side with respect to the inner surface 61a of the cap 61, and the sloping surfaces 46b become the second sloping part positioned on the downstream side of the resistance part 36, where the distance gradually becomes wider toward the downstream side with respect to the inner surface 61a of the cap 61. Also, when the rotor 31 rotates in the counterclockwise direction, the sloping surfaces 46b become the first sloping part, and the sloping surfaces 46a become the second sloping part.

Because the assembly and operation of the rotary damper D in the fifth embodiment are the same as in the first embodiment, their explanations are omitted. Also, because the flow (movement) of the air mixed into the case 11 during the assembly is the same as in the second embodiment, its explanation is omitted. In the fifth embodiment also, the same effect as in the first to fourth embodiments can be obtained.

Figure 9:
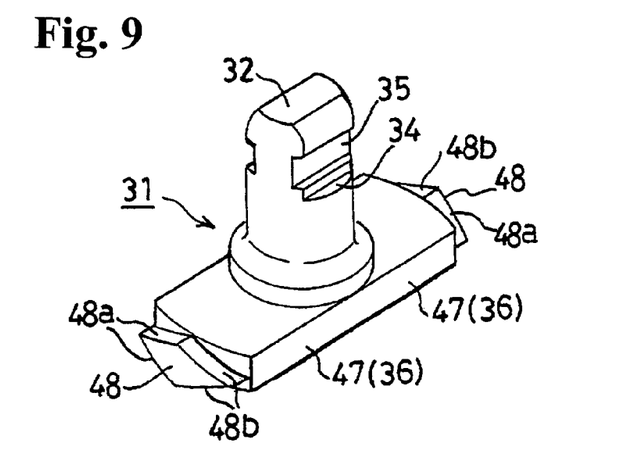
FIG. 9 is a perspective view of a rotor constituting a rotary damper according to a sixth embodiment of the invention.

FIG. 9 is a perspective view of a rotor constituting a rotary damper according to a sixth embodiment of the invention. The same symbols are assigned to the same or corresponding parts as in FIGS. 1 to 8, and their explanations are omitted.

The rotor 31 made of a synthetic resin shown in FIG. 9 is held inside the case 11, and is formed of the shaft part 32 protruding from the case 11, and two resistance parts 36 extending horizontally and radially at a 180-degree interval from the shaft part 32. Also, each of the resistance parts 36 is formed of a radial flat plate 47 connected to the shaft part 32, and a flat diamond-shaped projection 48 connected to an outer perimeter surface of the radial flat plate 47 and having sloping surfaces 48a and 48b at an upper side and a lower side, respectively.

When the rotor 31 rotates in the clockwise direction, the sloping surfaces 48a become the first sloping part positioned on the upstream side of the resistance parts 36, where the distance gradually becomes narrower going downstream with respect to the inner surface 13a of the bottom part 13 and the inner surface 61a of the cap 61. The sloping surfaces 48b become the second sloping part positioned on the downstream side of the resistance parts 36, where the distance gradually becomes wider going downstream with respect to the inner surface 13a of the bottom part 13 and the inner surface 61a of the cap 61. Also, when the rotor 31 rotates in the counterclockwise direction, the sloping surfaces 48b become the first sloping part, and the sloping surfaces 48a become the second sloping part.

Because the assembly and operation of the rotary damper D in the sixth embodiment are the same as in the first embodiment, their explanations are omitted. Also, because the flow (movement) of the air mixed into the case 11 during the assembly is the same as in the second embodiment, its explanation is omitted. In the sixth embodiment also, the same effect as in the first to fifth embodiments can be obtained.

Figure 10:
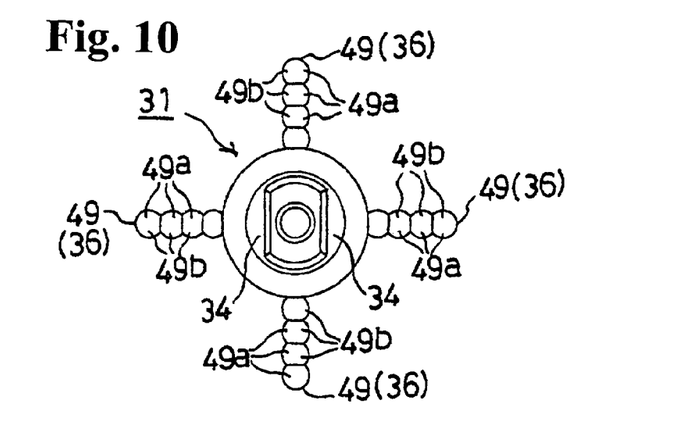
FIG. 10 is a plan view of a rotor constituting a rotary damper according to a seventh embodiment of the invention.

FIG. 10 is a plan view of a rotor constituting a rotary damper according to a seventh embodiment of the invention. The same symbols are assigned to the same or corresponding parts as in FIGS. 1 to 9, and their explanations are omitted.

The rotor 31 made of a synthetic resin shown in FIG. 10 is held inside the case 11, and is formed of the shaft part 32 partially protruding from the case 11, and the resistance parts 36 extending outward horizontally and radially at a 90-degree interval from the shaft part 32 and comprising spherical union bodies 49 having spheres connected like dumplings. Also, on each of the spherical union bodies 49 (resistance parts 36), there are provided hemispheric surfaces (sloping parts) 49a and 49b on both upper sides at the upstream side and the downstream side in the rotational direction.

When the rotor 31 rotates in the clockwise direction, the hemispheric surfaces 49a become the first sloping part positioned on the upstream side of the resistance part 36, where the distance gradually becomes narrower toward the downstream side with respect to the inner surface 13a of the bottom part 13, the inner perimeter surface 14a of the cylindrical wall part 14, and the inner surface 61a of the cap 61, and the hemispheric surfaces 49b become the second sloping part positioned on the downstream side of the resistance part 36, where the distance gradually becomes wider toward the downstream side with respect to the inner surface 13a of the bottom part 13, the inner perimeter surface 14a of the cylindrical wall part 14, and the inner surface 61a of the cap 61. Also, when the rotor 31 rotates in the counterclockwise direction, the hemispheric surfaces 49b become the first sloping part, and the hemispheric surfaces 49a become the second sloping part.

Because the assembly and operation of the rotary damper D in this seventh embodiment are the same as in the first embodiment, their explanations are omitted. Also, because the flow (movement) of the air mixed into the case 11 during assembly is the same as in the second embodiment, its explanation is omitted. In the seventh embodiment also, the same effect as in the first to sixth embodiments can be obtained.

Figure 11:
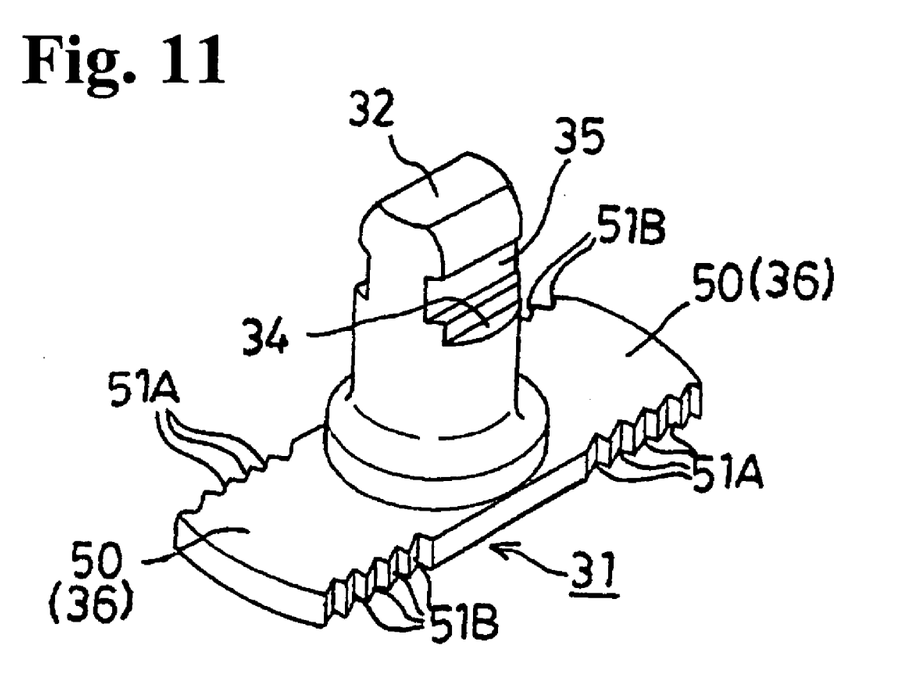
FIG. 11 is a perspective view of a rotor constituting a rotary damper according to an eighth embodiment of the invention.

FIG. 11 is a perspective view of a rotor constituting a rotary damper according to an eighth embodiment of the invention. The same symbols are assigned to the same or corresponding parts in FIGS. 1 to 10, and their explanations are omitted.

The rotor 31 made of a synthetic resin shown in FIG. 11 is held inside the case 11, and is formed of the shaft part 32 partially protruding from the case 11, and the resistance part 36 comprising a radial flat plate 50 having a I-cut circle planar shape and extending horizontally and radially at a 180-degree interval from the shaft part 32. Also, on the radial flat plate 50 (resistance part 36), there are provided plural triangularly shaped cut-outs 51A and 51B recessed from an outside of the radial flat plate 50 toward an inside of the radial flat plate 50, that is, having a long side of the radial flat plate 50 as a base, on both sides at the upstream side and the downstream side in the rotational direction.

When the rotor 31 rotates in the clockwise direction, the cut-outs 51A become the first sloping part positioned on the upstream side of the resistance part 36, where the distance gradually becomes narrower toward the downstream side with respect to the inner surface 13a of the bottom part 13 and the inner surface 61a of the cap 61, and the cut-outs 51B become the second sloping part positioned on the downstream side of the resistance part 36, where the distance gradually becomes wider toward the downstream side with respect to the inner surface 13a of the bottom part 13 and the inner surface 61a of the cap 61. Also, when the rotor 31 rotates in the counterclockwise direction, the cut-outs 51B become the first sloping part, and the cut-outs 51A become the second sloping part.

Because the assembly and operation of the rotary damper D in the eighth embodiment are the same as in the first embodiment, their explanations are omitted. Also, because the flow (movement) of the air mixed into the case 11 during assembly is the same as in the second embodiment, its explanation is omitted. In the eighth embodiment, the same effect as in the first to sixth embodiments can be obtained.

In the above-mentioned embodiments, the examples have been shown, in which the rotor 31 is rotatable supported with the bearing part 16 on the case 11 and the recess 33 on the shaft part 32. The rotor may be constituted such that the recess is provided on the case and the bearing part is provided on the shaft. Also, in the embodiments, the torque is generated mainly between the inner perimeter surface 14a of the case 11 and the outer perimeter surface of the resistance body 36. It also may be constituted such that the torque is generated mainly between the inner perimeter surface of the cap and the outer perimeter surface of the resistance body.

Also, in the embodiments, the housing is formed of the case 11 and the cap 61. The receiving part 15 for the silicone oil 21 is provided in the case 11. The through-hole 62 is provided in the cap 61 for inserting the shaft part 32 of the rotor 31, and the O-ring 71 is provided for sealing between the cap 61 and the shaft part 32 to prevent leakage of the silicone oil 21. It also may be constituted such that the receiving part for the silicone oil is provided in the cap, and the through-hole for inserting the shaft part of the rotor is provided in the case. The O-ring is provided for sealing between the case and the shaft to prevent leakage of the silicone oil.

Also, the silicone oil 21 is used as the viscous fluid, but other viscous fluids functioning in the same manner, for example such as grease, also can be used. Also, the resistance part 36 is integrally formed on the shaft part 32, but it also may be constituted such that the shaft part and the resistance part are molded separately, and have a square shaft and a square hole to rotate integrally.

The disclosure of Japanese Patent Application No. 2003-349465, filed on Oct. 8, 2003, is incorporated in the application.

While the invention has been explained with reference to the specific embodiments of the invention, the explanation is illustrative and the invention is limited only by the appended claims.

What is claimed is:

1. A rotary damper comprising:
   a housing,
   a viscous fluid filled in the housing,
   a rotor disposed in the housing and having a shaft part partially protruding from the housing and a resistance part provided on the shaft part for moving in the viscous fluid inside the housing,
   a seal member disposed between the shaft part and the housing for preventing leakage of the viscous fluid,
   a first sloping part provided on the resistance part at an upstream side in a rotational direction thereof and having a distance relative to an inner surface of the housing gradually decreasing toward a downstream side in the rotational direction, and
   a second sloping part provided on the resistance part at the downstream side in the rotational direction and having a distance relative to the inner surface of the housing gradually increasing toward the downstream side in the rotational direction;
   wherein said resistance part includes radial portions extending radially outwardly from the shaft part, and end portions provided on outer sides of the radial portions, each of said end portions having an outer surface facing an inner surface of the housing to form the first and second sloping parts, and upper and lower surfaces; and
   wherein each of said radial portions is a rectangular flat plate, and each of said end portions is an arc-shaped plate attached perpendicularly to an end of the rectangular flat plate and having a thickness less than that of the outer surface.

2. A rotary damper according to claim 1, wherein said rectangular flat plate is attached to a center of the arc-shaped plate to have spaces relative to upper, lower, front and rear edges of the arc-shaped plate.

3. A rotary damper according to claim 2, wherein said arc-shaped plate includes the first and second sloping parts at two circumferential ends thereof in a horizontal direction so that distances to the inner surface of the housing gradually decreases toward a center side.

4. A rotary damper according to claim 3, wherein said viscous fluid provides viscosity and shear resistance substantially between the inner surface of the housing and the outer surface of the arc-shaped plate.

* * * * *